US009776606B2

(12) United States Patent
Kim

(10) Patent No.: US 9,776,606 B2
(45) Date of Patent: Oct. 3, 2017

(54) WIRELESS TENSION ADJUSTING SYSTEM OF HAND PARKING BRAKE AND OPERATING METHOD THEREOF

(71) Applicants: Hyundai Motor Company, Seoul (KR); Kia Motors Corporation, Seoul (KR)

(72) Inventor: Tae Hyeong Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 274 days.

(21) Appl. No.: 14/562,743

(22) Filed: Dec. 7, 2014

(65) Prior Publication Data

US 2016/0082934 A1 Mar. 24, 2016

(30) Foreign Application Priority Data

Sep. 22, 2014 (KR) ........................ 10-2014-0125782

(51) Int. Cl.

*B60R 21/015* (2006.01)
*B60T 7/10* (2006.01)
*B60T 17/22* (2006.01)
*B60T 7/08* (2006.01)
*B60T 13/74* (2006.01)

(52) U.S. Cl.

CPC .............. *B60T 7/108* (2013.01); *B60T 7/085* (2013.01); *B60T 7/107* (2013.01); *B60T 13/746* (2013.01); *B60T 17/221* (2013.01)

(58) Field of Classification Search

CPC ..... B60T 7/10; F16C 1/10; G01L 5/28; B25B 25/00; B25B 29/00

USPC ............................................ 73/862.391, 121

See application file for complete search history.

(56) References Cited

U.S. PATENT DOCUMENTS 7,819,042 B2 * 10/2010 Petrak .................. B60T 13/746 74/501.5 R
8,250,914 B2 * 8/2012 Sullivan ................ B60T 17/221 73/121
8,800,357 B2 * 8/2014 Macarthur ............. B25B 25/00 73/129
2007/0151401 A1 7/2007 Murase
2008/0047788 A1 2/2008 Tsubouchi (Continued)

FOREIGN PATENT DOCUMENTS

JP 1994-022616 6/1994
JP 2003-127848 A 5/2003
JP 2006-232066 A 9/2006

(Continued)

*Primary Examiner* — Lisa Caputo
*Assistant Examiner* — Octavia Hollington
(74) *Attorney, Agent, or Firm* — Mintz Levin Cohn Ferris Glovsky and Popeo, P.C.; Peter F. Corless

(57) ABSTRACT

A wireless tension adjusting system of a hand parking brake includes: a nut runner fastened to an that adjusts nut adjusting tension which is present in a parking brake cable, the nut runner being configured to apply rotational force to the adjusting nut; an external force measuring jig configured to measure external force of a parking brake lever caused by the rotational force applied to the adjusting nut from the nut runner; and a controlling unit configured to transmit an operation stop signal to the nut runner based on the external force which is measured by the external force measuring jig.

8 Claims, 7 Drawing Sheets

1
2
1

(56) References Cited

U.S. PATENT DOCUMENTS

| | | | |
|---|---|---|---|
| 2009/0193922 | A1 | 8/2009 | Hayashi et al. |
| 2009/0277261 | A1 | 11/2009 | Sullivan |

FOREIGN PATENT DOCUMENTS

| | | | |
|---|---|---|---|
| JP | 2007-145202 | A | 6/2007 |
| JP | 2008-051196 | A | 3/2008 |
| JP | 2009-210123 | A | 9/2009 |
| KP | 10-2002-0048477 | A | 6/2002 |
| KR | 10-1998-0047686 | A | 9/1998 |
| KR | 10-2000-0042025 | A | 7/2000 |

* cited by examiner (a)

(b)

WIRELESS TENSION ADJUSTING SYSTEM OF HAND PARKING BRAKE AND OPERATING METHOD THEREOF

CROSS-REFERENCE TO RELATED APPLICATION

This application claims the benefit of and priority to Korean Patent Application No. 10-2014-0125782, filed on Sep. 22, 2014 in the Korean Intellectual Property Office, the disclosure of which is incorporated herein in its entirety by reference.

TECHNICAL FIELD

The present disclosure relates to a wireless tension adjusting system of a hand parking brake and an operating method thereof, and more particularly, to a wireless tension adjusting system of a hand parking brake capable of automatically adjusting a fastening amount of an adjusting nut by measuring external force applied to the parking brake lever in real-time, when a parking brake lever is installed, and an operating method thereof.

BACKGROUND

In general, a parking brake is a brake which is used when a vehicle is parked for a long time, or in the case of emergency such as a case in which a foot brake is not operated. Since the parking brake is generally operated by hand, it is also called as a hand brake.

A conventional parking brake has allowed proper tension to be present in a parking brake cable by adjusting an equalizer 2 interposed between a parking brake lever 1 and the parking brake cable, as shown in FIG. 1. Also, as shown in FIG. 2, one side of the parking brake cable 3 is fixed to the equalizer 2 and an adjusting bolt 4 having one side in a length direction fixed to the parking brake lever penetrates through the equalizer 2 and is fastened thereto, such that equalizer 2 has interposed between the parking brake cable 3 and the parking brake lever. In addition, a dedicated socket 6 is coupled to an adjusting nut 5 provided to the other side in the length direction of the adjusting bolt 4 which penetrates through the equalizer 2 and protrudes therefrom, while the adjusting nut 5 is rotated by the dedicated socket 6, such that the adjusting nut 5 presses the equalizer 2 and moves a position thereof, thereby generating tension at the parking brake cable 3.

However, since the mechanism of generating tension in a conventional parking brake cable adjusts the tension only by interspersion of parts, such as the adjusting bolt, the adjusting nut, a length of the cable, and the like, and a moving distance of the adjusting nut, it is difficult to adjust the tension occurring at the parking brake cable uniformly.

SUMMARY

The present disclosure has been made to solve the above-mentioned problems occurring in the related art while advantages achieved by the related art are maintained intact.

An aspect of the present disclosure provides a wireless tension adjusting system of a hand parking brake capable of automatically adjusting a fastening amount of an adjusting nut by measuring tension of a parking brake cable occurring based on a movement of the adjusting nut in real-time when a parking brake lever is mounted, and an operating method thereof.

According to embodiments of the present disclosure, a wireless tension adjusting system of a hand parking brake includes: a nut runner fastened to an that adjusts nut adjusting tension which is present in a parking brake cable, the nut runner being configured to apply rotational force to the adjusting nut; an external force measuring jig configured to measure external force of a parking brake lever caused by the rotational force applied to the adjusting nut from the nut runner; and a controlling unit configured to transmit an operation stop signal to the nut runner based on the external force which is measured by the external force measuring jig.

The wireless tension adjusting system may further include an equalizer interposed between the parking brake cable and the parking brake lever.

The equalizer may include an adjusting bolt having the adjusting nut to one side thereof and having a predetermined length, the adjusting bolt penetrating through the equalizer and being fixed to a rotation shaft of the parking brake lever.

The nut runner may include a fastening part fastened to the adjusting nut and an insertion space part having the adjusting bolt inserted thereinto.

The external force measuring jig may be further configured to measure a load occurring at the parking brake lever.

The controlling unit may include: a load cell indicator configured to receive the measured external force from the external force measuring jig, a programmable logic controller (PLC) configured to receive the external force from the load cell indicator, and a nut runner controller configured to receive a signal from the PLC and to transmit the operation stop signal to the nut runner.

Furthermore, according to embodiments of the present disclosure, an operating method of a wireless tension adjusting system of a hand parking brake includes: measuring tension in a parking brake cable applied to a parking brake lever which is installed in a vehicle body; and adjusting the tension in the parking brake cable using an equalizer connected to the parking brake lever.

The operating method of the wireless tension adjusting system may further include: measuring external force applied to the parking brake lever using an external force measuring jig mounted in the parking brake lever.

The operating method of the wireless tension adjusting system may further include: applying, by a nut runner mounted in the equalizer, rotational force to an adjusting nut provided in the equalizer; receiving, at the nut runner, an operation stop signal from a nut runner controller; and stopping an operation of the nut runner in response to the received operation stop signal.

The operating method of the wireless tension adjusting system may further include: transmitting, from the external force measuring jig, a load occurring at the parking brake lever to a load cell indicator indicating a measured value which is measured by the external force measuring jig, when the rotational force is applied to the adjusting nut.

The operating method of the wireless tension adjusting system may further include: transmitting, from the load cell indicator, a load value which is measured by the external force measuring jig to a programmable logic controller (PLC).

The operating method of the wireless tension adjusting system may further include: determining, by the PLC, whether the load value and a threshold value are the same; and transmitting, from the PLC, the operation stop signal to the nut runner controller, when the load value and the threshold value are the same.

Furthermore, according to embodiments of the present disclosure, a non-transitory computer readable medium containing program instructions for an operating method of a wireless tension adjusting system of a hand parking brake includes: program instructions that measure tension in a parking brake cable applied to a parking brake lever which is installed in a vehicle body; and program instructions that adjust the tension in the parking brake cable using an equalizer connected to the parking brake lever.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
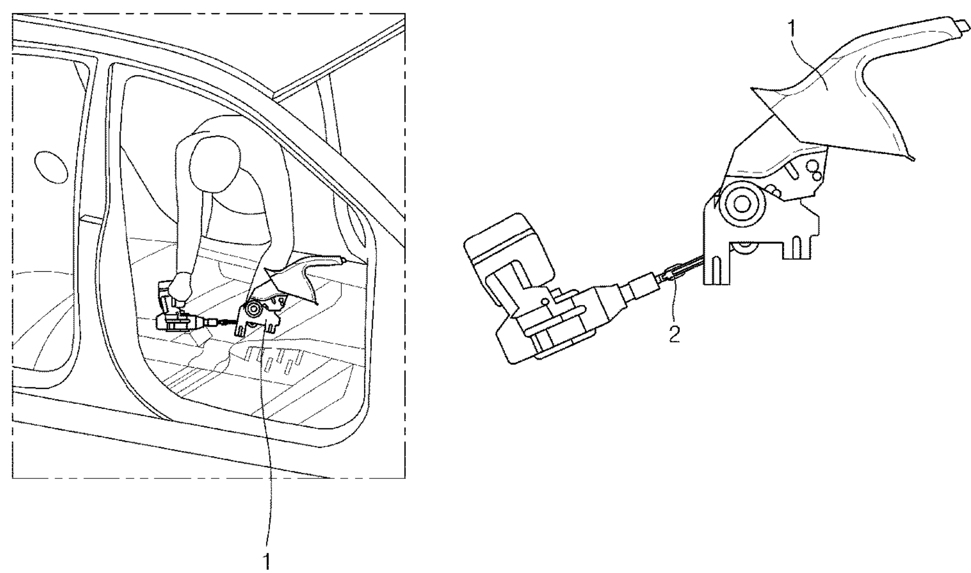
FIG. 1 is a constitution diagram in which a conventional parking brake is installed and a constitution diagram in which conventional main parts are installed.
Figure 2:
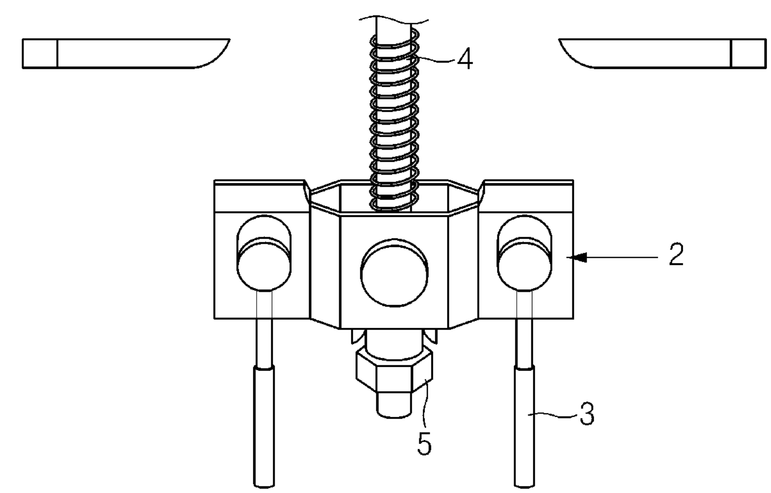
FIG. 2 is a diagram illustrating a conventional equalizer for forming tension in a parking brake cable and an equalizer operation.
Figure 2:
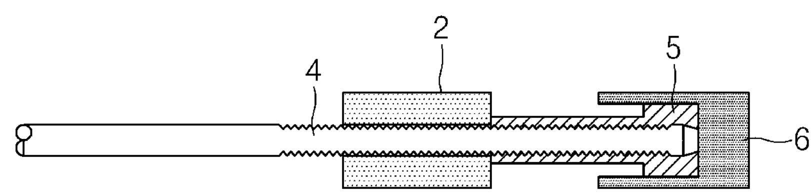
Figure 2:
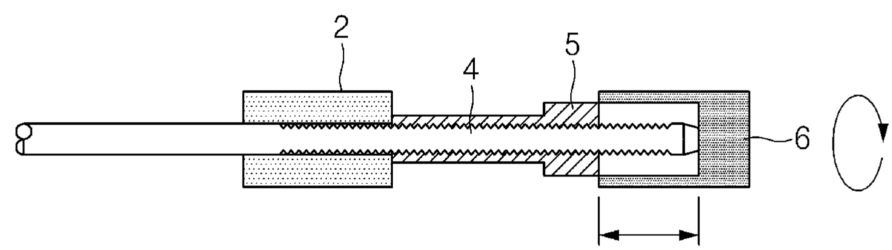
Figure 3:
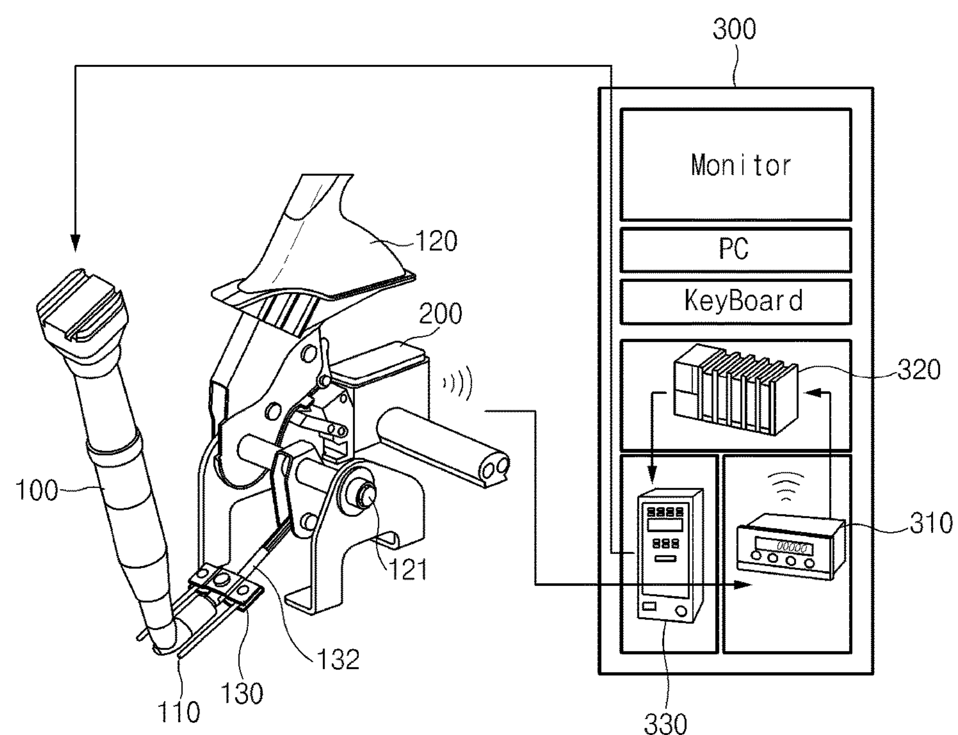
FIG. 3 is a schematic diagram of a wireless tension adjusting system of a hand parking brake according to embodiments of the present disclosure.
Figure 4:
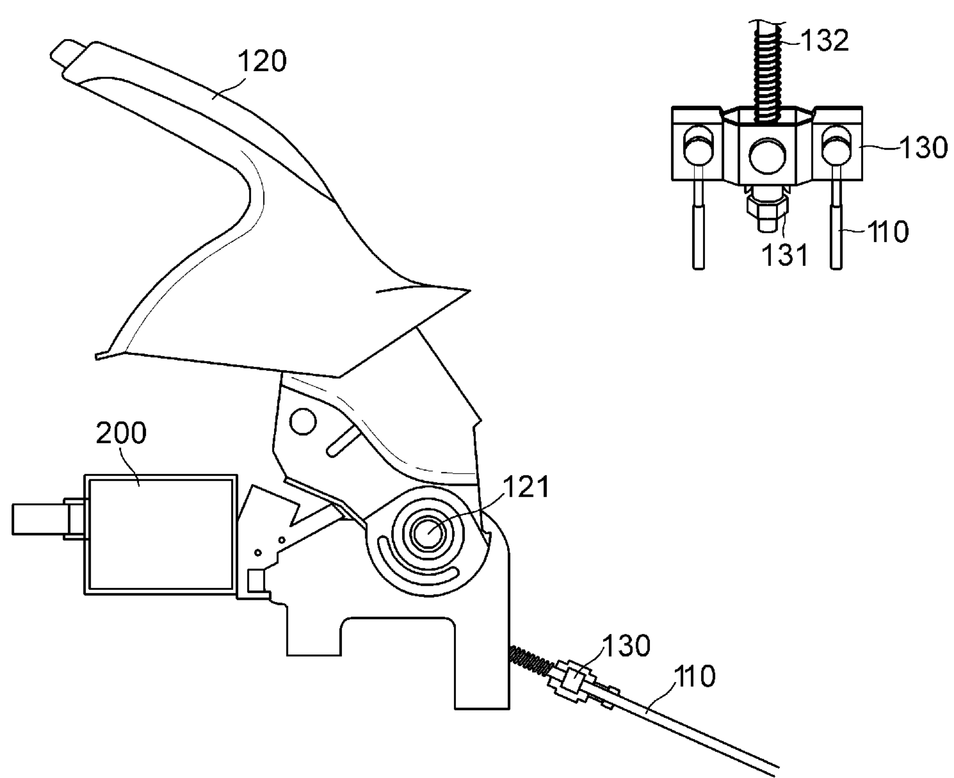
FIG. 4 is a constitution diagram of main parts of the wireless tension adjusting system of the hand parking brake of FIG. 3.
Figure 5:
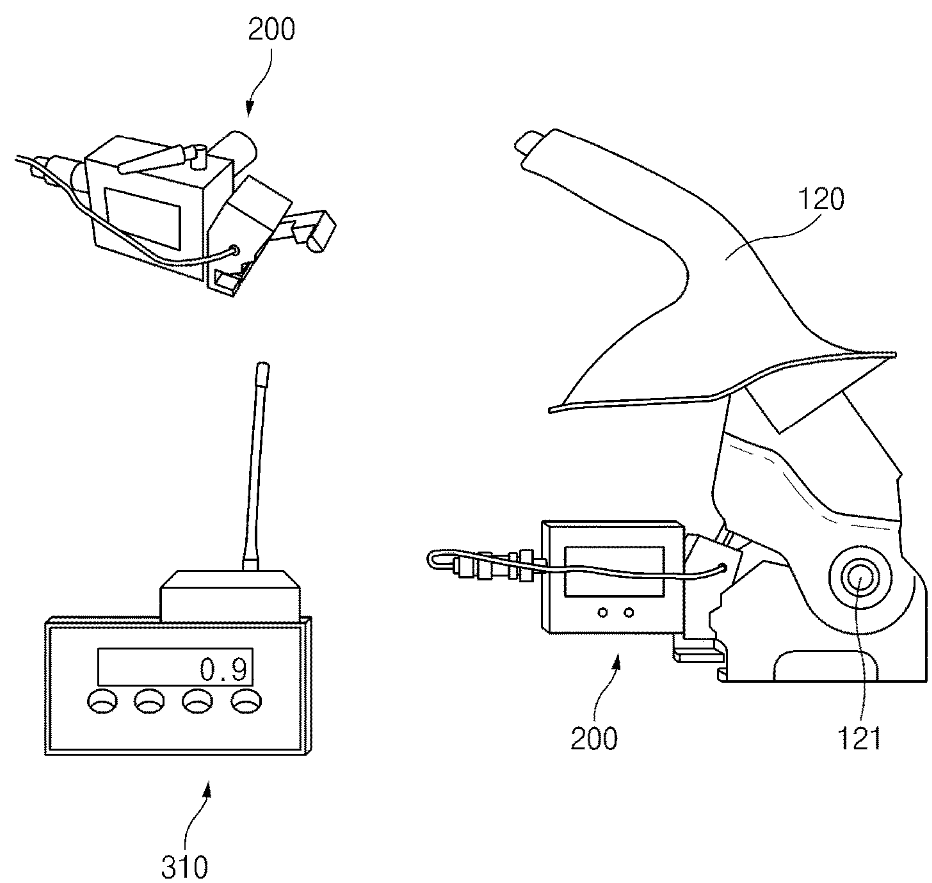
FIG. 5 is a perspective view of an external force measuring jig of the wireless tension adjusting system of the hand parking brake of FIG. 3, a front view of a load cell indicator, and a side view of a parking brake lever.
Figure 6:
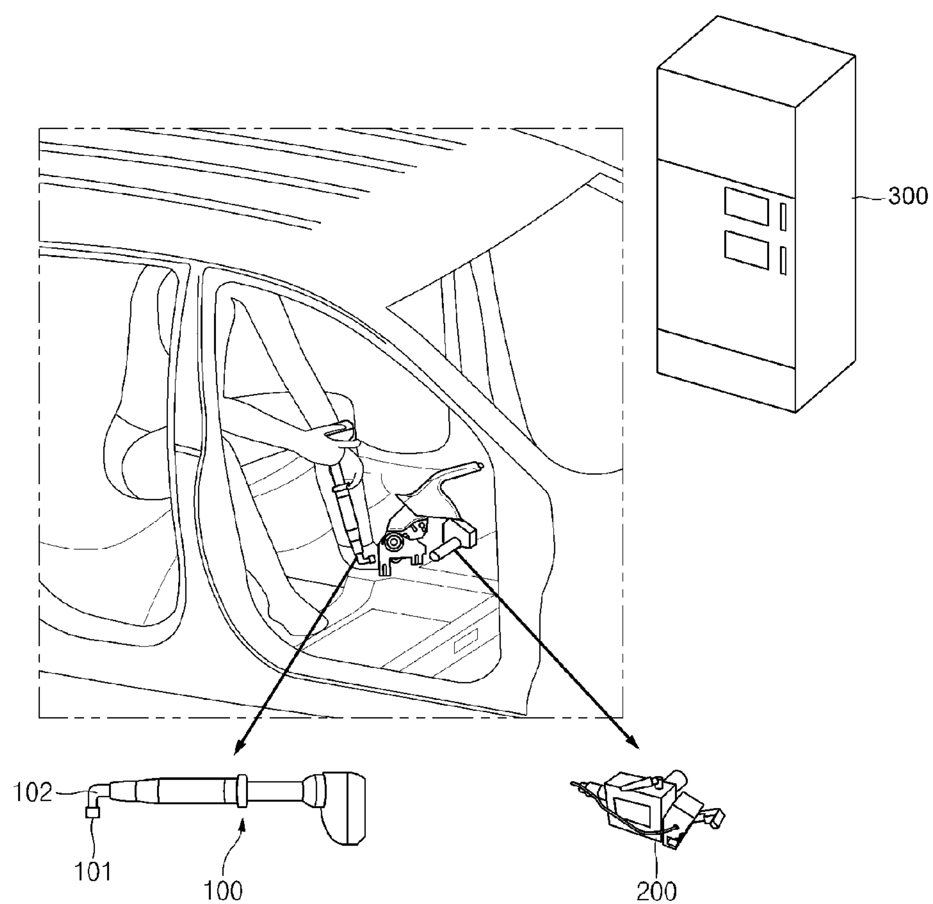
FIG. 6 is a tension set constitution diagram of a parking brake cable of the wireless tension adjusting system of the hand parking brake of FIG. 3.

Embodiments of the present disclosure will be described in detail with reference to the accompanying drawings.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller and/or controlling unit. The terms "controller" and "controlling unit" may refer to a hardware device that includes a memory and a processor. The memory is configured to store program instructions, and the processor is configured to execute the program instructions to perform one or more processes which are described further below. Moreover, it is understood that the below methods may be executed by an apparatus comprising the controller and/or controlling unit, whereby the apparatus is known in the art to be suitable for implementing a wireless tension adjusting system of a hand parking brake.

Furthermore, the controller and/or controlling unit of the present disclosure may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

As shown in FIGS. 3 to 6, a wireless tension adjusting system of a hand parking brake according to embodiments of the present disclosure includes a nut runner 100 fastened to an adjusting nut 131 that adjusts tension which is present in a parking brake cable 110, the nut runner 100 being configured to apply rotational force to the adjusting nut 131, an external force measuring jig 200 configured to measure external force of a parking brake lever 120 caused by the rotational force applied to the adjusting nut 131 from the nut runner 100, and a controlling unit 300 configured to transmit an operation stop signal to the nut runner 100 based on the external force which is measured by the external force measuring jig 200.

An equalizer 130 is interposed between the parking brake cable 110 and the parking brake lever. The equalizer 130 is interposed between the parking brake cable 110 and the parking brake lever 120 to cause tension in the parking brake cable 110. The equalizer 130 includes an adjusting bolt 132 having the adjusting nut 131 attached to one side thereof and having a predetermined length.

The adjusting bolt 132 penetrates through the equalizer 130 and is fixed to a rotation shaft 121 of the parking brake lever 120. The nut runner 100 can press the equalizer 130 and move the adjusting nut 131 and the equalizer 130 along a length direction of the adjusting bolt 132 by applying the rotational force to the adjusting nut 131 and moving a position of the adjusting nut 131.

The nut runner 100 includes a fastening part 101 which is fastened to the adjusting nut 131 and an insertion space part 102 into which the adjusting bolt 132 is inserted. In addition, a motor part applying the rotational force to the fastening part 101 and a receiving unit receiving a signal from the controlling unit 300 are provided.

The external force measuring jig 200 is mounted in a rotation radius of the parking brake lever 120 which is formed based on the rotation shaft 121. The external force measuring jig 200 is mounted so as to be adjacent to a coupling part of the parking brake lever 120 and the rotation shaft 121, and is manufactured so that it is not moved by the external force after being mounted. The external force measuring jig 200 measures a load occurring at the parking brake lever 120, where the load that occurs at the parking brake lever 120 is in proportion to the magnitude of tension of the parking cable.

As the adjusting nut 131 provided in the equalizer 130 is fastened, the tension present in the parking brake cable 110 increases. Moment rotating the parking brake lever 120 based on the rotation shaft 121 is increased by the tension in the parking brake cable 110.

The load occurring at the parking brake lever 120 is increased by the increased moment. Therefore, in the case in which the load occurred at the parking brake lever 120 is measured by the external force measuring jig 200, the tension formed in the parking brake cable 110 may be estimated. The controlling unit 300 includes a load cell indicator 310 receiving the measured external force from the external force measuring jig 200, a programmable logic controller (PLC) 320 receiving the external force from the load cell indicator 310, and a nut runner controller 330 receiving a signal from the PLC 320 and transmitting an operation stop signal to the nut runner 100, whereby the operation stop signal instructs the nut runner 100 to stop its operation.

The load cell indicator 310 receives an external force which is measured by the external force measuring jig 200 in real-time, that is, the load occurred at the parking brake lever 120. The PLC 320 receives the external force which is measured in real-time by the external force measuring jig 200 from the load cell indicator 310 and compares magnitude of the external force, that is, a load value and a threshold value to each other in real-time by a pre-stored logic. When the load value and the threshold value are the same, the nut runner controller 330 receives an operation stop instruction of the nut runner 100 from the PLC 320 and transmits the operation stop signal to the nut runner 100.

Figure 7:
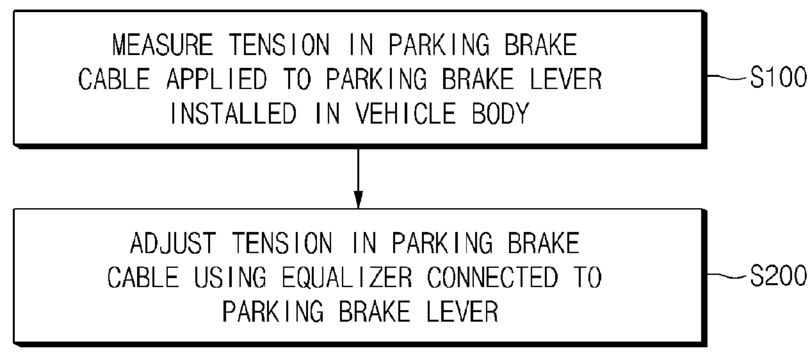
FIG. 7 is a sequence diagram of an operating method of a wireless tension adjusting system of a hand parking brake according to embodiments of the present disclosure.
Figure 7:
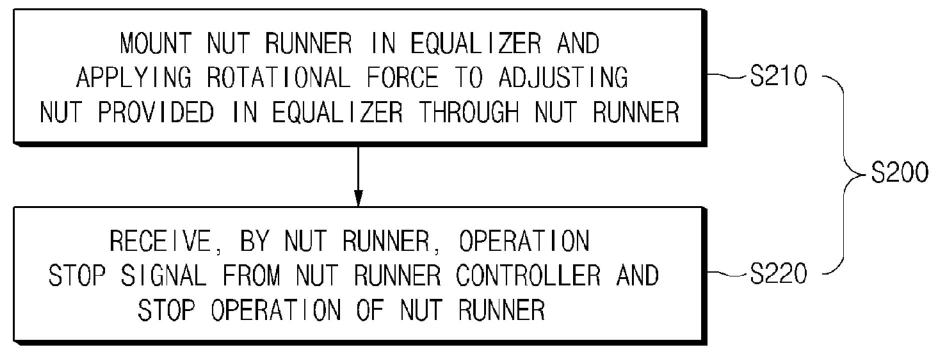

The wireless tension adjusting system of the hand parking brake according to embodiments of the present disclosure having the above-mentioned configuration is operated according to the sequence diagram shown in FIG. 7.

As shown in FIG. 7, an operating method of a wireless tension adjusting system of a hand parking brake according to embodiments of the present disclosure includes measuring tension in a parking brake cable 110 applied to a parking brake lever 120 which is installed in a vehicle body (S100), and adjusting the tension in the parking brake cable 110 using an equalizer 130 connected to the parking brake lever 120 (S200). In the measuring of the tension in the parking brake cable 110 (S100), an external force measuring jig 200 is mounted in the parking brake lever 120 so as to measure external force applied to the parking brake lever 120.

The adjusting of the tension in the parking brake cable (S200) includes mounting a nut runner 100 in the equalizer 130 applying rotational force to an adjusting nut 131 provided in the equalizer 130 through the nut runner 100 (S210), and receiving, by the nut runner 100, an operation stop signal from a nut runner controller 330 and stopping an operation of the nut runner 100 (S220). When the rotational force is applied to the adjusting nut 131, the external force measuring jig 200 transmits a load occurring at the parking brake lever 120 to a load cell indicator 310 indicating a measured value which is measured by the external force measuring jig 200. The load cell indicator 310 transmits a load value measured by the external force measuring jig 200 to a PLC 320. The PLC 320 determines whether or not the load value and a threshold value are the same, and transmits the operation stop signal of the nut runner 100 to the nut runner controller 330 when the load value and the threshold value are the same.

As described above, in the wireless tension adjusting system of the hand parking brake and the operating method thereof according to embodiments of the present disclosure, it is possible to set the tension applied to the parking brake cable to a target value when the parking brake lever is installed. Further, since the tension is automatically formed in the parking brake cable, it is possible to simplify the production of the hand parking brake and reduce occurrences of defects.

As described above, although the present disclosure has been described with reference to embodiments and the accompanying drawings, it would be appreciated by those skilled in the art that the present disclosure is not limited thereto but various modifications and alterations might be made without departing from the scope defined in the following claims.

What is claimed is:

1. A wireless tension adjusting system of a hand parking brake, the wireless tension adjusting system comprising:

a nut runner fastened to an adjusting nut that adjusts tension which is present in a parking brake cable, the nut runner being configured to apply rotational force to the adjusting nut;

an external force measuring jig configured to measure external force of a parking brake lever caused by the rotational force applied to the adjusting nut from the nut runner; and a controlling unit configured to transmit an operation stop signal to the nut runner based on the external force which is measured by the external force measuring jig, wherein the controlling unit includes:

a load cell indicator configured to receive the measured external force from the external force measuring jig, a programmable logic controller (PLC) configured to receive the external force from the load cell indicator, and a nut runner controller configured to receive a signal from the PLC and to transmit the operation stop signal to the nut runner.

2. The wireless tension adjusting system according to claim 1, further comprising an equalizer interposed between the parking brake cable and the parking brake lever.

3. The wireless tension adjusting system according to claim 2, wherein the equalizer includes an adjusting bolt having the adjusting nut to one side thereof and having a predetermined length, the adjusting bolt penetrating through the equalizer and being fixed to a rotation shaft of the parking brake lever.

4. The wireless tension adjusting system according to claim 3, wherein the nut runner includes:

a fastening part fastened to the adjusting nut, and an insertion space part having the adjusting bolt inserted thereinto.

5. The wireless tension adjusting system according to claim 1, wherein the external force measuring jig is further configured to measure a load occurring at the parking brake lever.

6. An operating method of a wireless tension adjusting system of a hand parking brake, the operating method comprising:

measuring tension in a parking brake cable applied to a parking brake lever which is installed in a vehicle body;

adjusting the tension in the parking brake cable using an equalizer connected to the parking brake lever;

measuring external force applied to the parking brake lever using an external force measuring jig mounted in the parking brake lever;

transmitting, from the external force measuring jig, a load occurring at the parking brake lever to a load cell indicator indicating a measured value which is measured by the external force measuring jig, when a rotational force is applied to an adjusting nut;

transmitting, from the load cell indicator, a load value which is measured by the external force measuring jig to a programmable logic controller (PLC);

determining, by the PLC, whether the load value and a threshold value are the same; and transmitting, from the PLC, an operation stop signal to a nut runner controller, when the load value and the threshold value are the same.

7. The operating method according to claim 6, wherein the adjusting of the tension in the parking brake cable comprises:

applying, by a nut runner mounted in the equalizer, rotational force to an adjusting nut provided in the equalizer;

receiving, at the nut runner, an operation stop signal from a nut runner controller; and stopping an operation of the nut runner in response to the received operation stop signal.

8. A non-transitory computer readable medium containing program instructions for an operating method of a wireless tension adjusting system of a hand parking brake, the computer readable medium comprising:

program instructions that measure tension in a parking brake cable applied to a parking brake lever which is installed in a vehicle body;

program instructions that adjust the tension in the parking brake cable using an equalizer connected to the parking brake lever;

program instructions that measure external force applied to the parking brake lever using an external force measuring jig mounted in the parking brake lever;

program instructions that transmit, from the external force measuring jig, a load occurring at the parking brake lever to a load cell indicator indicating a measured value which is measured by the external force measuring jig, when a rotational force is applied to an adjusting nut;

program instructions that transmit, from the load cell indicator, a load value which is measured by the external force measuring jig to a programmable logic controller (PLC);

program instructions that determine, by the PLC, whether the load value and a threshold value are the same; and program instructions that transmit, from the PLC, an operation stop signal to a nut runner controller, when the load value and the threshold value are the same.

* * * * *